(12) United States Patent
Chang et al.

(10) Patent No.: US 9,778,405 B2
(45) Date of Patent: Oct. 3, 2017

(54) LIGHT GUIDE PLATE AND LIGHT SOURCE MODULE

(71) Applicant: Radiant Opto-Electronics Corporation, Kaohsiung (TW)

(72) Inventors: Chia-Yin Chang, Kaohsiung (TW); Chin-Ting Weng, Kaohsiung (TW)

(73) Assignee: Radiant Opto-Electronics Corporation, Kaoshiung (TW)

( * ) Notice: Subject to any disclaimer, the term of this patent is extended or adjusted under 35 U.S.C. 154(b) by 0 days.

(21) Appl. No.: 15/202,540

(22) Filed: Jul. 5, 2016

(65) Prior Publication Data

US 2016/0313489 A1    Oct. 27, 2016

Related U.S. Application Data

(63) Continuation of application No. 14/463,675, filed on Aug. 20, 2014, now Pat. No. 9,442,240, which is a
(Continued)

(30) Foreign Application Priority Data

Mar. 16, 2012  (TW) .............................. 101109144 A
Jun. 27, 2012  (TW) .............................. 101212386 U
(Continued)

(51) Int. Cl.
    *F21V 7/04*    (2006.01)
    *F21V 8/00*    (2006.01)

(52) U.S. Cl.
CPC .......... *G02B 6/0016* (2013.01); *G02B 6/002* (2013.01); *G02B 6/004* (2013.01); *G02B 6/0036* (2013.01); *G02B 6/0045* (2013.01); *G02B 6/0061* (2013.01)

(58) Field of Classification Search
CPC .... G02B 6/0016; G02B 6/002; G02B 6/0061; G02B 6/0036; G02B 6/0045; G02B 6/004
See application file for complete search history.

(56) References Cited

U.S. PATENT DOCUMENTS

6,022,117 A * 2/2000 Tenmyo ................. G02B 6/002
                                                 362/16
6,480,307 B1    11/2002 Yang
(Continued)

FOREIGN PATENT DOCUMENTS

CN        101470301 A     7/2009
TW        200846730 A    12/2008
(Continued)

*Primary Examiner* — Donald Raleigh
(74) *Attorney, Agent, or Firm* — CKC & Partners Co., Ltd.

(57) ABSTRACT

A light guide plate and a light source module are described. The light guide plate includes a main body, first stripe microstructures and second stripe microstructures. The main body includes a light incidence surface, a light-emitting surface and a light reflective surface opposite to the light-emitting surface. The light incidence surface is connected between the light-emitting surface and the light reflective surface. The light-emitting surface includes a first microstructure region and a second microstructure region arranged sequentially, and the first microstructure region is near the light incidence surface. The first stripe microstructures are disposed in the first microstructure region and extending along a direction from one side near the light incidence surface to the other side away from the light incidence surface. The second stripe microstructures are disposed in the second microstructure region along the direction. A gradient of each second stripe microstructure is gradually varied along the direction.

21 Claims, 15 Drawing Sheets

Related U.S. Application Data continuation-in-part of application No. 13/751,166, filed on Jan. 28, 2013, now Pat. No. 9,223,079.

(30) Foreign Application Priority Data

Aug. 20, 2013 (TW) ............................. 102129835 A
Jan. 2, 2014 (TW) ............................. 103100086 A

(56) References Cited

U.S. PATENT DOCUMENTS

| | | | |
|---|---|---|---|
| 7,898,613 B2 | 3/2011 | Jung et al. | |
| 8,896,786 B2* | 11/2014 | Seo ..................... | G02B 6/0036 349/65 |
| 9,075,171 B2 | 7/2015 | Kurata et al. | |
| 2003/0076669 A1* | 4/2003 | Itoh ..................... | G02B 6/0016 362/621 |
| 2006/0104093 A1 | 5/2006 | Feng et al. | |
| 2007/0139968 A1 | 6/2007 | Chang | |
| 2010/0085509 A1* | 4/2010 | Seo ..................... | G02B 6/0036 349/65 |
| 2011/0176089 A1* | 7/2011 | Ishikawa .............. | G02B 6/0018 349/65 |

FOREIGN PATENT DOCUMENTS

| | | |
|---|---|---|
| TW | M350026 U | 2/2009 |
| WO | 2008093930 A1 | 8/2008 |

* cited by examiner

LIGHT GUIDE PLATE AND LIGHT SOURCE MODULE

CROSS-REFERENCE TO RELATED APPLICATION

This application is a continuation application of U.S. application Ser. No. 14/463,675, filed on Aug. 20, 2014, which is a continuation-in-part application of U.S. application Ser. No. 13/751,166, filed on Jan. 28, 2013, now U.S. Pat. No. 9,223,079, which claims priority to Taiwan Application Serial Number 101109144, filed Mar. 16, 2012, and Taiwan Application Serial Number 101212386, filed Jun. 27, 2012. The U.S. application Ser. No. 14/463,675 also claims priority to Taiwan Application Serial Number 102129835, filed Aug. 20, 2013, and Taiwan Application Serial Number 103100086, filed Jan. 2, 2014. The entire disclosures of all the above applications are hereby incorporated by reference herein.

BACKGROUND

Field of Invention

The present invention relates to a light guide element, and more particularly to a light guide plate and a light source module.

Description of Related Art

As the rapid development of point light sources, such as light-emitting diodes (LEDs), a light source type of backlight modules is gradually changed from a linear light source type to a point light source type, for example from conventional linear cold-cathode fluorescent lamps (CCFLs) to point light-emitting diodes. Refer to FIG. 1 and FIG. 2. FIG. 1 and FIG. 2 respectively illustrate a top view of an arrangement of a light guide plate and light-emitting diodes and a side view of a conventional backlight module. A backlight module 100 mainly includes a light guide plate 102, a plurality of light-emitting diodes 108 and a cover 112.

In the backlight module 100, the light-emitting diodes 108 are disposed near a light incidence surface 106 of the light guide plate and emit light 110 toward the light incidence surface 106 of the light guide plate 102. The cover 112 covers the light-emitting diodes 108 and a portion of a light-emitting surface 104 on a light incidence side of the light guide plate 102, i.e. covers a non-visible region 118 of the light-emitting surface 104. Light 110 emitted by the light-emitting diodes 108 enters the light guide plate 102 through the light incidence surface 106, and is emitted out of the light guide plate 102 through the light-emitting surface 104 of the light guide plate 102 after being guided by the light guide plate 102.

Refer to FIG. 3. FIG. 3 illustrates a side view of another conventional backlight module. A structure of a backlight module 100a is substantially the same as that of the aforementioned backlight module 100, and a difference between the two structures is that a light guide plate 102a of the backlight module 100a includes a tapered portion 120 and a flat plate portion 122. A thickness of the tapered portion 120 is gradually lessened from the light incidence surface 106 toward the flat plate portion 122. In the backlight module 100a, expect for a top edge of the light incidence surface 106, distances between the light-emitting surface 104a of the light guide plate 102a and the cover 112 increase.

However, as shown in FIG. 2 and FIG. 3, if a covering range of the cover 112 is too short, an appearance light leakage phenomenon is very easy to form in the non-visible region 118 on the light incidence side of the backlight module 100 or 100a. In addition, the light-emitting diodes 108 are highly directional, so that an uneven brightness condition due to the light leakage in the non-visible region 118 of the backlight module 100 or 100a is very serious. Accordingly, eyes 114 of a user see that the backlight module 100 or 100a has poor appearance brightness uniformity and hot spots 116 usually formed on its light incidence side, such as shown in FIG. 4. Therefore, appearance brightness distribution of the conventional backlight modules 100 and 100a is uneven to seriously affect vision effects of the backlight modules 100 and 100a.

SUMMARY

Therefore, one aspect of the present invention is to provide a light guide plate and a light source module, in which a first microstructure region of a light-emitting surface of the light guide plate near a light incidence surface is set with various first stripe microstructures, which extend along a direction from one side of the main body near the light incidence surface to the other side of the main body away from the light incidence surface. The first stripe microstructures can scatter incident light of a non-visible region, so that leakage light on the non-visible region can be effectively blurred to greatly improve an uneven brightness phenomenon in the non-visible region.

Another aspect of the present invention is to provide a light guide plate and a light source module, in which a second microstructure region of the light-emitting surface of the light guide plate following the first microstructure region is set with various second stripe microstructures. Optical trends and degrees of light concentration of the light guide plate can be changed by varying shapes, angles, heights, depths or arrangements of second stripe microstructures, thereby increasing luminance value and luminance uniformity of the light guide plate and the light source module.

Still another aspect of the present invention is to provide a light source module, which has emitted light of highly uniform.

According to the aforementioned aspects, the present invention provides a light guide plate. The light guide plate includes a main body, a plurality of first stripe microstructures and a plurality of second stripe microstructures. The main body includes a light incidence surface, a light-emitting surface and a light reflective surface, in which the light-emitting surface is opposite to the light reflective surface, the light incidence surface is connected between the light-emitting surface and the light reflective surface, and the light-emitting surface includes a first microstructure region and a second microstructure region arranged in sequence, and the first microstructure region is nearer the light incidence surface than the second microstructure region. The first stripe microstructures are disposed in the first microstructure region and extending along a direction from one side of the main body near the light incidence surface to the other side of the main body away from the light incidence surface. The second stripe microstructures are disposed in the second microstructure region along the direction, in which a gradient of each of the second stripe microstructures is gradually varied along the direction.

According to a preferred embodiment of the present invention, the light guide plate further includes a plurality of microstructures disposed on the light incidence surface.

According to another preferred embodiment of the present invention, a cross-sectional profile of each of the microstructures or each of the first stripe microstructures is in a V-shape, an inverted V-shape or an arc-shape.

According to still another preferred embodiment of the present invention,

According to yet another preferred embodiment of the present invention, each of the microstructures is a convex portion or a concave portion.

According to further another preferred embodiment of the present invention, the light-emitting surface further includes a blank region between the first microstructure region and the light-incidence surface.

According to still yet another preferred embodiment of the present invention, the main body includes a tapered portion and a flat plate portion. The tapered portion has a first end and a second end opposite to each other, and a thickness of the first end is larger than a thickness of the second end. The flat plate portion extends from the second end along the direction, and a thickness of the flat plate portion is equal to the thickness of the second end.

According to still further another preferred embodiment of the present invention, the first stripe microstructures are disposed on the flat plate portion.

According to yet further another preferred embodiment of the present invention, the light-emitting surface further includes a blank region between the first microstructure region and the microstructures, and the blank region is located on the tapered portion or on both of the tapered portion and the flat plate portion.

According to yet further another preferred embodiment of the present invention, the first stripe microstructures are closely adjacent to each other.

According to yet further another preferred embodiment of the present invention, the first stripe microstructures are separated from each other.

According to yet further another preferred embodiment of the present invention, each of the first stripe microstructures is a convex portion or a concave portion.

According to yet further another preferred embodiment of the present invention, each of the second stripe microstructures is a convex portion or a concave portion.

According to yet further another preferred embodiment of the present invention, when each of the second stripe microstructures is the convex portion, the gradient of each of the second stripe microstructures includes a height of each of the second stripe microstructures, and the height of each of the second stripe microstructures becomes gradually greater from the light incidence surface along the direction. When each of the second stripe microstructures is the concave portion, the gradient of each of the second stripe microstructures includes a depth of each of the second stripe microstructures, and the depth of each of the second stripe microstructures becomes gradually greater from the light incidence surface along the direction.

According to yet further another preferred embodiment of the present invention, the gradient of each of the second stripe microstructures further includes a width of each of the second stripe microstructures, and width of each of the second stripe microstructures becomes gradually greater from the light incidence surface along the direction.

According to yet further another preferred embodiment of the present invention, when each of the second stripe microstructures is the convex portion, the gradient of each of the second stripe microstructures includes a height of each of the second stripe microstructures, and the height of each of the second stripe microstructures becomes gradually smaller from the light incidence surface along the direction. When each of the second stripe microstructures is the concave portion, the gradient of each of the second stripe microstructures includes a depth of each of the second stripe microstructures, and the depth of each of the second stripe microstructures becomes gradually smaller from the light incidence surface along the direction.

According to yet further another preferred embodiment of the present invention, the gradient of each of the second stripe microstructures further includes a width of each of the second stripe microstructures, and width of each of the second stripe microstructures becomes gradually smaller from the light incidence surface along the direction.

According to yet further another preferred embodiment of the present invention, a cross-sectional profile of each of the second stripe microstructures is in a V-shape, an inverted V-shape, an arc-shape or a trapezoid-shape.

According to the aforementioned aspects, the present invention further provides a light source module. The light source module includes a light guide plate as descried above and a plurality of light sources adjacent to the light incidence surface of the light guide plate.

According to a preferred embodiment of the present invention, the light guide plate further includes a plurality of microstructures disposed on the light incidence surface.

According to another preferred embodiment of the present invention, each of the second stripe microstructures is a convex portion or a concave portion. When each of the second stripe microstructures is the convex portion, the gradient of each of the second stripe microstructures includes a height and a width of each of the second stripe microstructures, and the height and the width of each of the second stripe microstructures become gradually greater from the light incidence surface along the direction. When each of the second stripe microstructures is the concave portion, the gradient of each of the second stripe microstructures includes a depth and the width of each of the second stripe microstructures, and the depth and the width of each of the second stripe microstructures become gradually greater from the light incidence surface along the direction.

According to still another preferred embodiment of the present invention, each of the second stripe microstructures is a convex portion or a concave portion. When each of the second stripe microstructures is the convex portion, the gradient of each of the second stripe microstructures includes a height and a width of each of the second stripe microstructures, and the height and the width of each of the second stripe microstructures become gradually smaller from the light incidence surface along the direction. When each of the second stripe microstructures is the concave portion, the gradient of each of the second stripe microstructures includes a depth and the width of each of the second stripe microstructures, and the depth and the width of each of the second stripe microstructures become gradually smaller from the light incidence surface along the direction.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION

Figure 5:
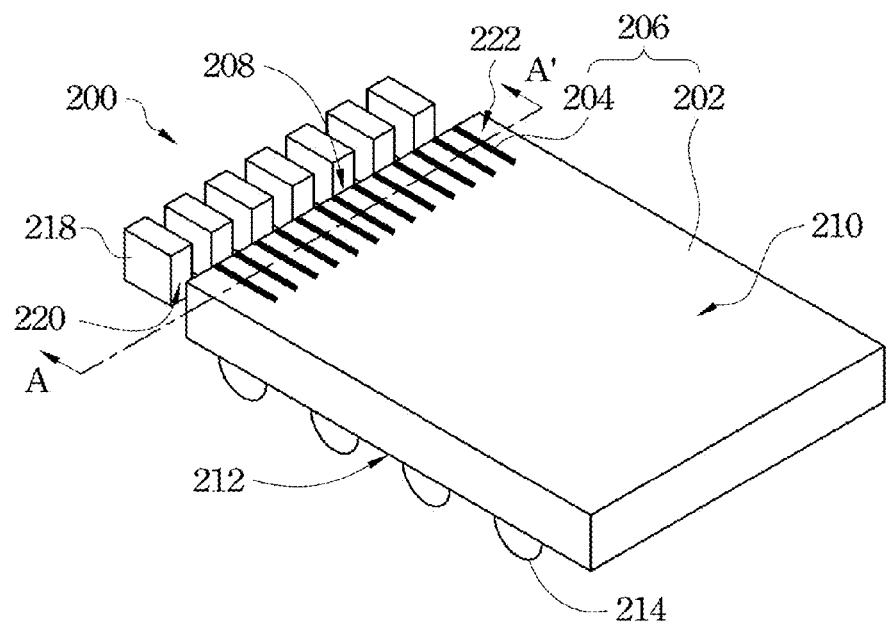
FIG. 5 illustrates a perspective view of a backlight module in accordance with an embodiment of the present invention.

Refer to FIG. 5. FIG. 5 illustrates a perspective view of a backlight module in accordance with an embodiment of the present invention. In the present embodiment, a backlight module 200 mainly includes a light guide plate 206 and a plurality of light sources 218. The light guide plate 206 includes a main body 202 and a plurality of stripe microstructures 204. In one exemplary example, the main body 202 may be a flat plate with a uniform thickness. The main body 202 may include a light incidence surface 208, a light-emitting surface 210 and a light reflective surface 212. In the main body 202, the light-emitting surface 210 and the light reflective surface 212 are on two opposite sides of the main body 202, and the light incidence surface 208 is connected between the light-emitting surface 210 and the light reflective surface 212. The light incidence surface 208 of the main body 202 may be a mirror surface or a surface having microstructures. In addition, the light-emitting surface 210 of the main body 202 may include a microstructure region 222 adjacent to the light incidence surface 208.

In the light guide plate 206, the stripe microstructures 204 are disposed in the microstructure region 222 of the light-emitting surface 210 of the main body 202. In one exemplary example, as shown in FIG. 5, the stripe microstructures 204 are arranged in the entire microstructure region 222 of the light-emitting surface 210. In one example, the stripe microstructures 204 are closely adjacent to each other. However, in another exemplary example, the stripe microstructures 204 arranged in the entire microstructure region 222 are not distributed in the entire microstructure region 222. An extending direction of each stripe microstructure 204 in the microstructure region 222 is parallel to a normal line of the light incidence surface 208. In one exemplary example, a range of the microstructure region 222 of the light-emitting surface 210 is within 20 mm extending from one end of the light-emitting surface, which is connected with the light incidence surface 208, along the normal line of the light incidence surface 208.

Figure 5A:
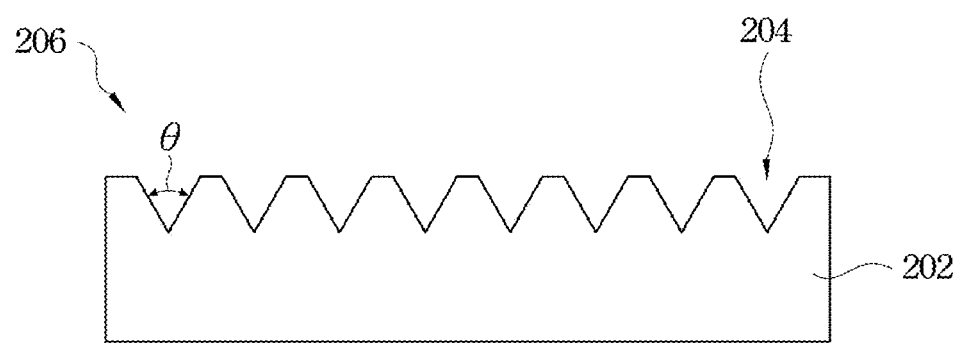
FIG. 5A is a cross-sectional view taken along a line AA' of the light guide plate of FIG. 5 in accordance with an embodiment of the present invention.
Figure 5B:
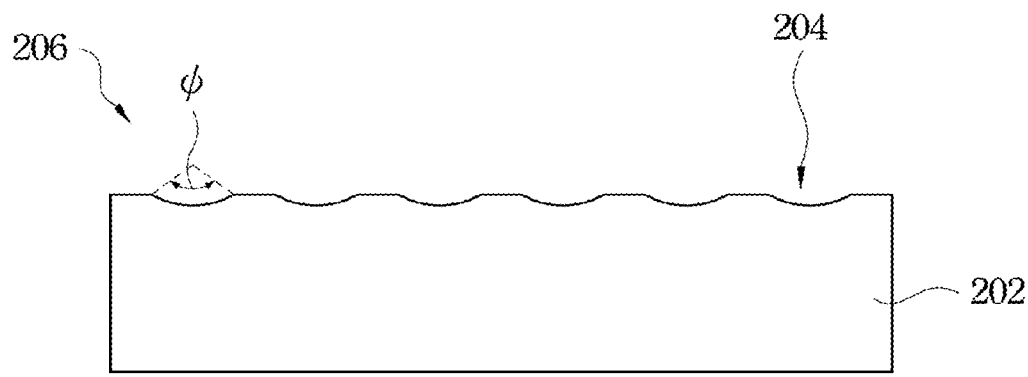
FIG. 5B is a cross-sectional view taken along a line AA' of the light guide plate of FIG. 5 in accordance with another embodiment of the present invention.

In some exemplary examples, the stripe microstructures 204 may be, for example, a plurality of V-cut structures as shown in FIG. 5A and/or a plurality of R-cut structures as shown in FIG. 5B. Referring to FIG. 5B again, Central angles φ of the stripe microstructures 204 composed of the R-cut structures may range from 60 degrees to 120 degrees, for example. In addition, referring to FIG. 5A again, flare angles θ of the stripe microstructures 204 composed of the V-cut structures may range from 60 degrees to 120 degrees, for example. In one preferred example, the central angles φ of the stripe microstructures 204 composed of the R-cut structures or the flare angles θ of the stripe microstructures 204 composed of the V-cut structures are 100 degrees.

Refer to FIG. 5 again. The light sources 218 are disposed at a side of the light incidence surface 208, and adjacent to the light incidence surface 208. Light-emitting surfaces 220 of the light sources 218 are preferably opposite to the light incidence surface 208 of the light guide plate 206, so that the light sources 218 can emit light toward the light incidence surface 208. In one exemplary example, the light sources 218 may be point light sources, such as light-emitting diodes. The emitting light of the point light sources, such as the light-emitting diodes, is highly directional and narrow, and by arranging the stripe microstructures 204 within the microstructure region 222 of the light-emitting surface 210, the light emitted from the microstructure region 222 of the light-emitting surface 210 of the main body 202 can be scattered. Therefore, the leakage light on the light incidence side of the light guide plate 206 is uniformed to further uniform brightness of a light-emitting surface of the backlight module 200.

In some exemplary examples, the light guide plate 206 may further selectively include a plurality of microstructures 214 according to optical performance required by the backlight module 200. As shown in FIG. 5, the microstructures 214 may be arranged on the light reflective surface 212 of the main body 202 of the light guide plate 206. The microstructures 214 may be stripe structures, such as V-cut structures and R-cut structures, or may be taper structures or taper indentations.

Figure 6A:
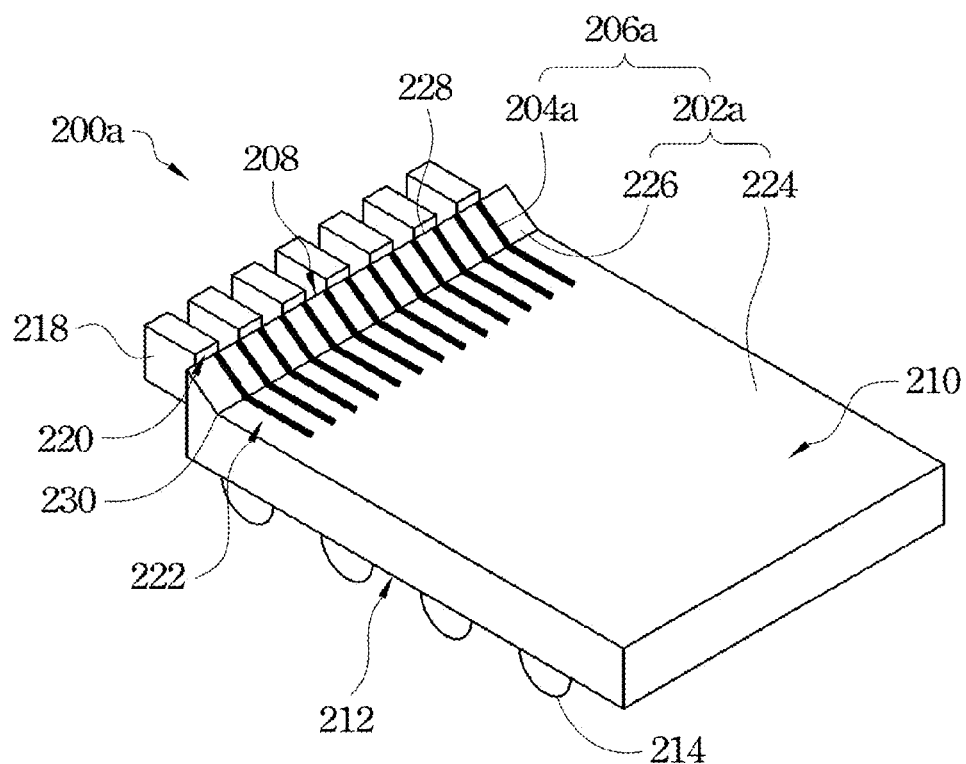
FIG. 6A illustrates a perspective view of a backlight module in accordance with another embodiment of the present invention.

The main body of the light guide plate of the present invention may not be a flat plate with a uniform thickness. Refer to FIG. 6A. FIG. 6A illustrates a perspective view of a backlight module in accordance with another embodiment of the present invention. A structure of a backlight module 200a of the present embodiment is substantially the same as that of the backlight module 200 of the aforementioned embodiment, and a difference between the two structures is that a main body 202a of a light guide plate 206a of the backlight module 200a is not a flat plate with a uniform thickness.

In the backlight module 200a, the light guide plate 206a includes a tapered portion 226 and a flat plate portion 224. The tapered portion 226 has a first end 228 and a second end 230 opposite to each other. The thickness of the tapered portion 226 is gradually decreased from the first end 228 to the second end 230, i.e. the first end 228 of the tapered portion 226 is thicker than the second end 230. In addition, the flat plate portion 224 extends from the second end 230 of the tapered portion 226 along the normal line of the light incidence surface 208. A thickness of the flat plate portion 224 is the same as that of the second end 230 of the tapered portion 226. In the present embodiment, the microstructure region 222 extends on the tapered portion 226 and a portion of the flat plate portion 224, and the stripe microstructures 204a are disposed in the microstructure region 222 on the tapered portion 226 and the flat plate portion 224.

Figure 6B:
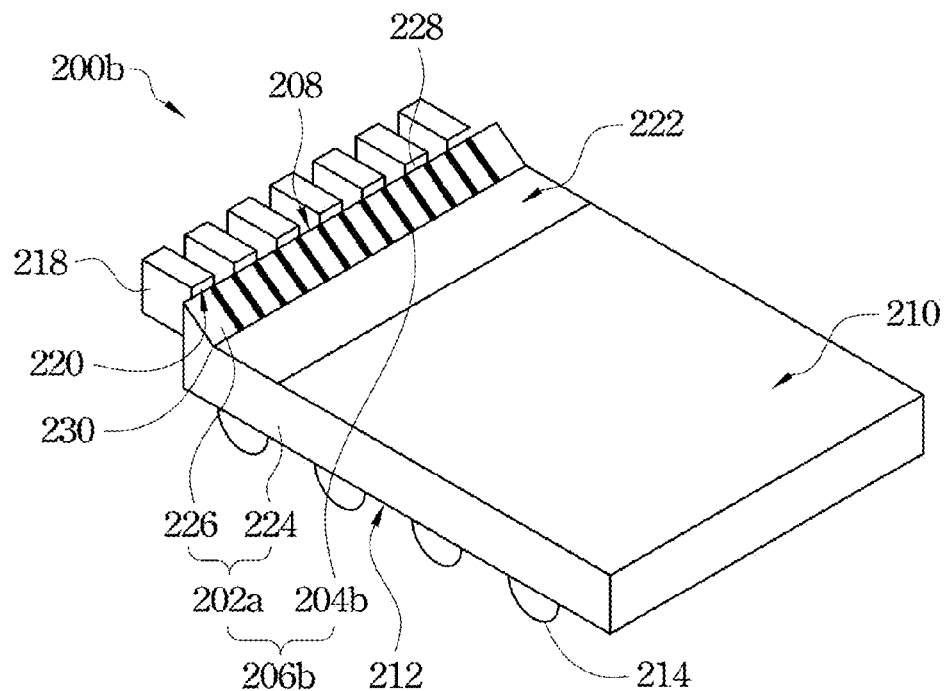
FIG. 6B illustrates a perspective view of a backlight module in accordance with still another embodiment of the present invention.
Figure 6C:
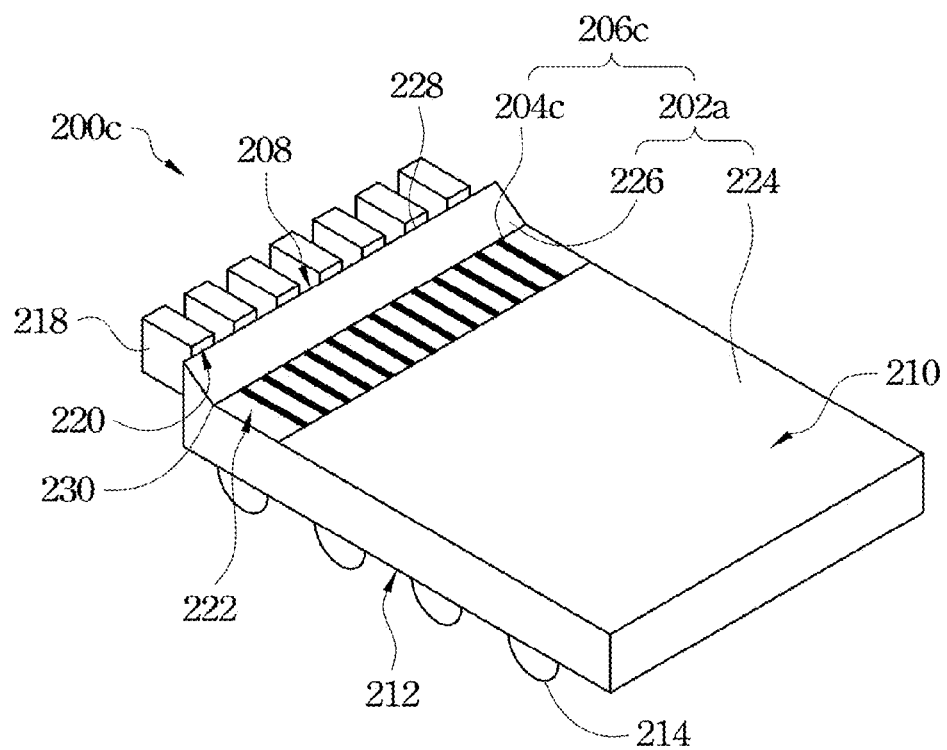
FIG. 6C illustrates a perspective view of a backlight module in accordance with yet another embodiment of the present invention.

The stripe microstructures of the present invention may not be distributed in the entire microstructure region. Refer to FIG. 6B and FIG. 6C. FIG. 6B and FIG. 6C respectively illustrate perspective views of backlight modules in accordance with another two embodiments of the present invention. Structures of backlight modules 200b and 200c are substantially the same as that of the backlight module 200a of the aforementioned embodiment, and differences among the structures of the backlight module 200a, 200b and 200c are that: stripe microstructures 204b of a light guide plate 206b of the backlight module 200b and the stripe microstructures 204c of a light guide plate 206c of the backlight module 200c are arranged in a portion of microstructure regions 222 respectively.

As shown in FIG. 6B, in the backlight module 200b, the stripe microstructures 204b of the light guide plate 206b only extend in the microstructure region 222 on the tapered portion 226 of the main body 202a. On the other hand, as shown in FIG. 6C, in the backlight module 200c, the stripe microstructures 204c of the light guide plate 206c only extend in the microstructure region 222 on the flat plate portion 224 of the main body 202a.

In the present invention, the microstructure region of the light-emitting surface of the main body of the light guide plate may be divided into several regions, and the regions may be set with stripe microstructures with different structure shapes, such as R-cut structures and V-cut structures. Or, the regions of the microstructure region may be set with stripe microstructures with a same structure shape but different central angles or flare angles. Certainly, the microstructure region of the light-emitting surface of the main body of the light guide plate may be set with stripe microstructures with a same structure shape and a same central angle or a same flare angle.

Figure 1:
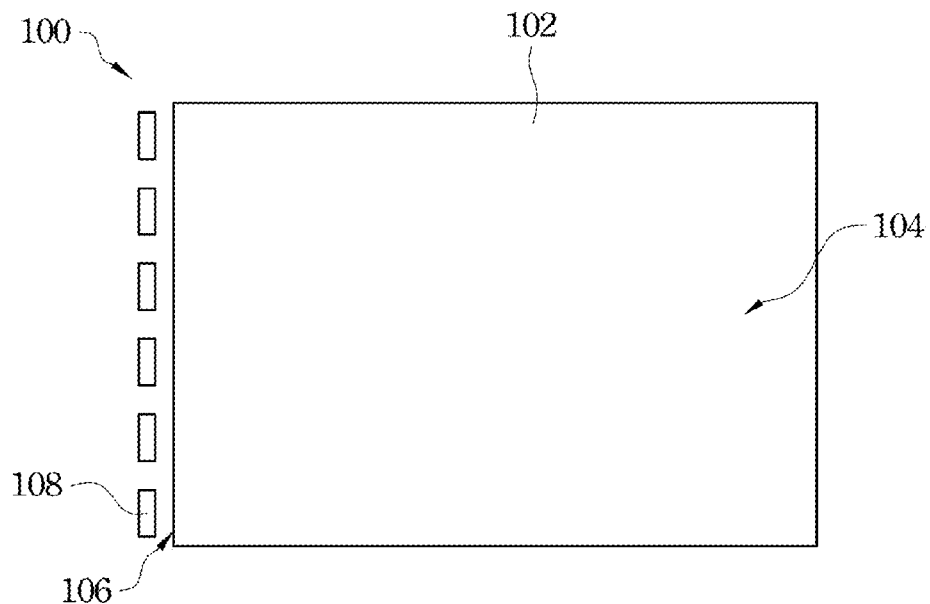
FIG. 1 illustrates a top view of an arrangement of a light guide plate and light-emitting diodes of a conventional backlight module.
Figure 2:
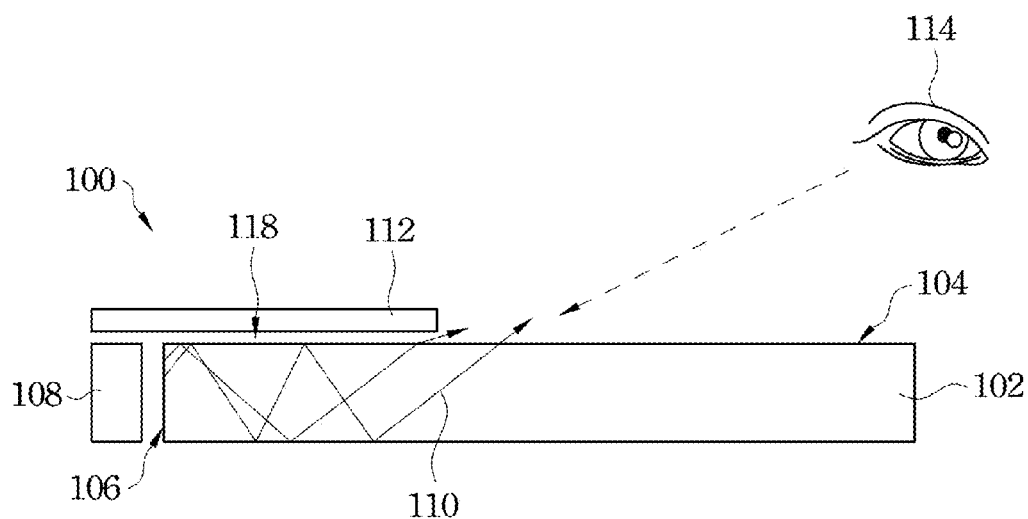
FIG. 2 illustrates a side view of the conventional backlight module.
Figure 3:
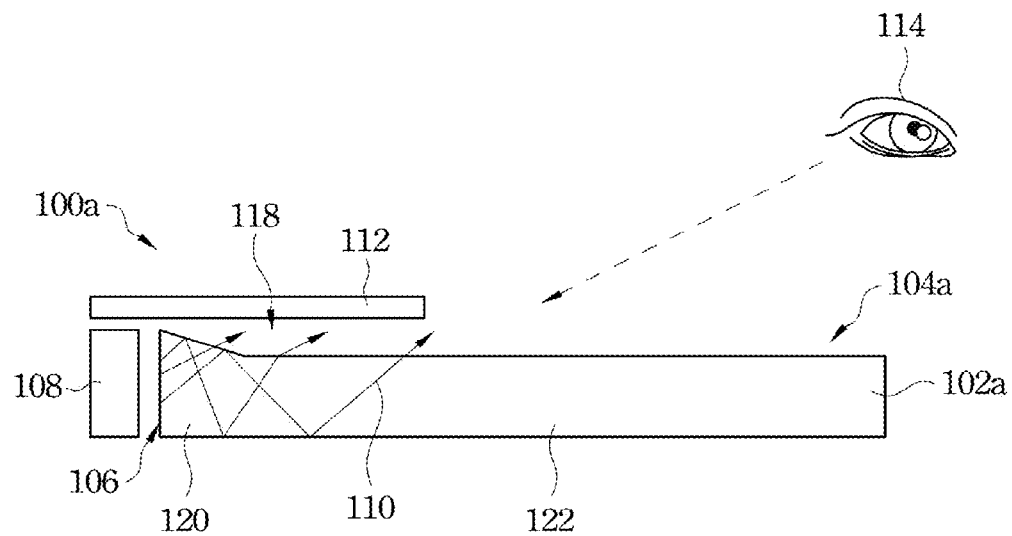
FIG. 3 illustrates a side view of another conventional backlight module.
Figure 4:
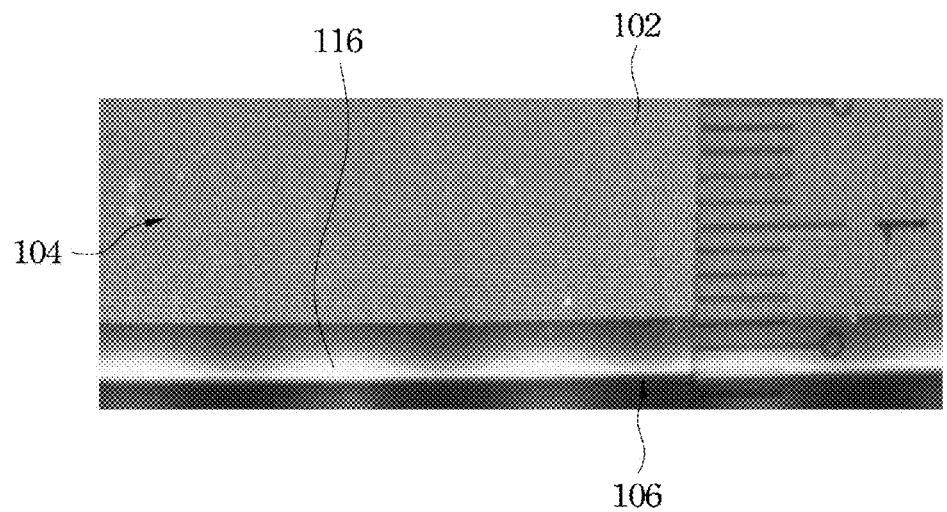
FIG. 4 is a diagram showing appearance brightness distribution on a light incidence side of a conventional backlight module.
Figure 7A:
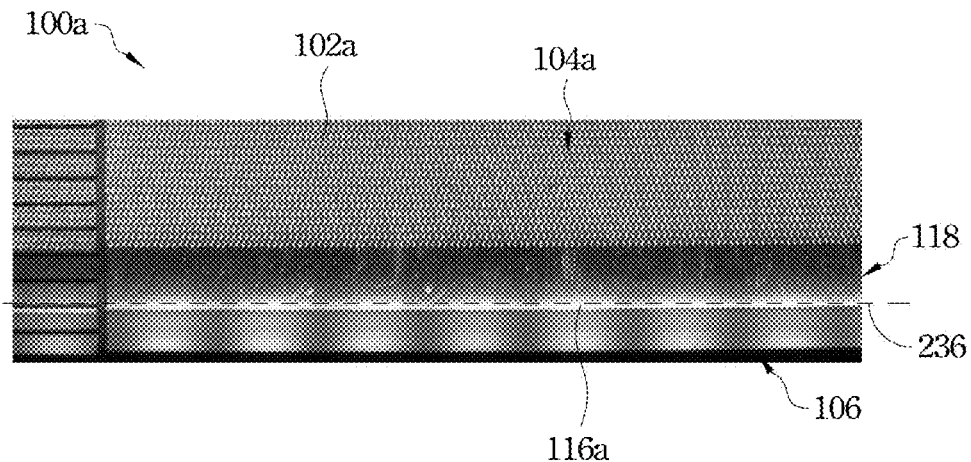
FIG. 7A is a diagram showing appearance brightness distribution on a light incidence side of the backlight module shown in FIG. 3.
Figure 7B:
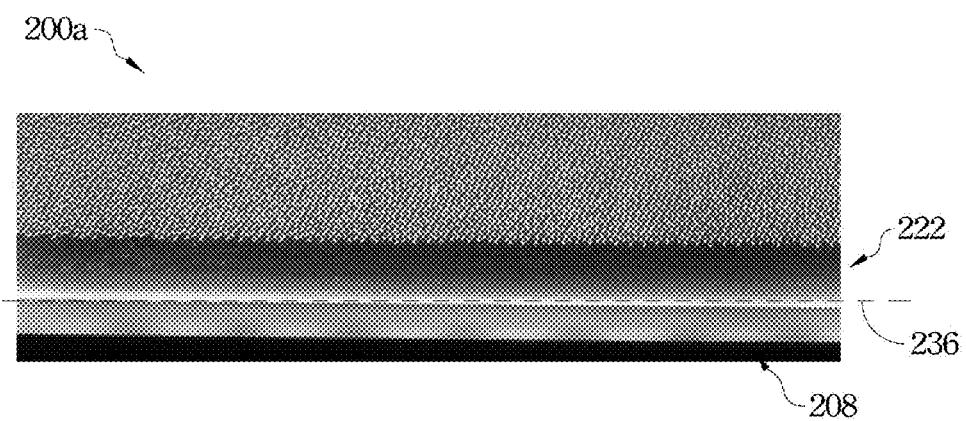
FIG. 7B is a diagram showing appearance brightness distribution on a light incidence side of the backlight module shown in FIG. 6A.
Figure 8:
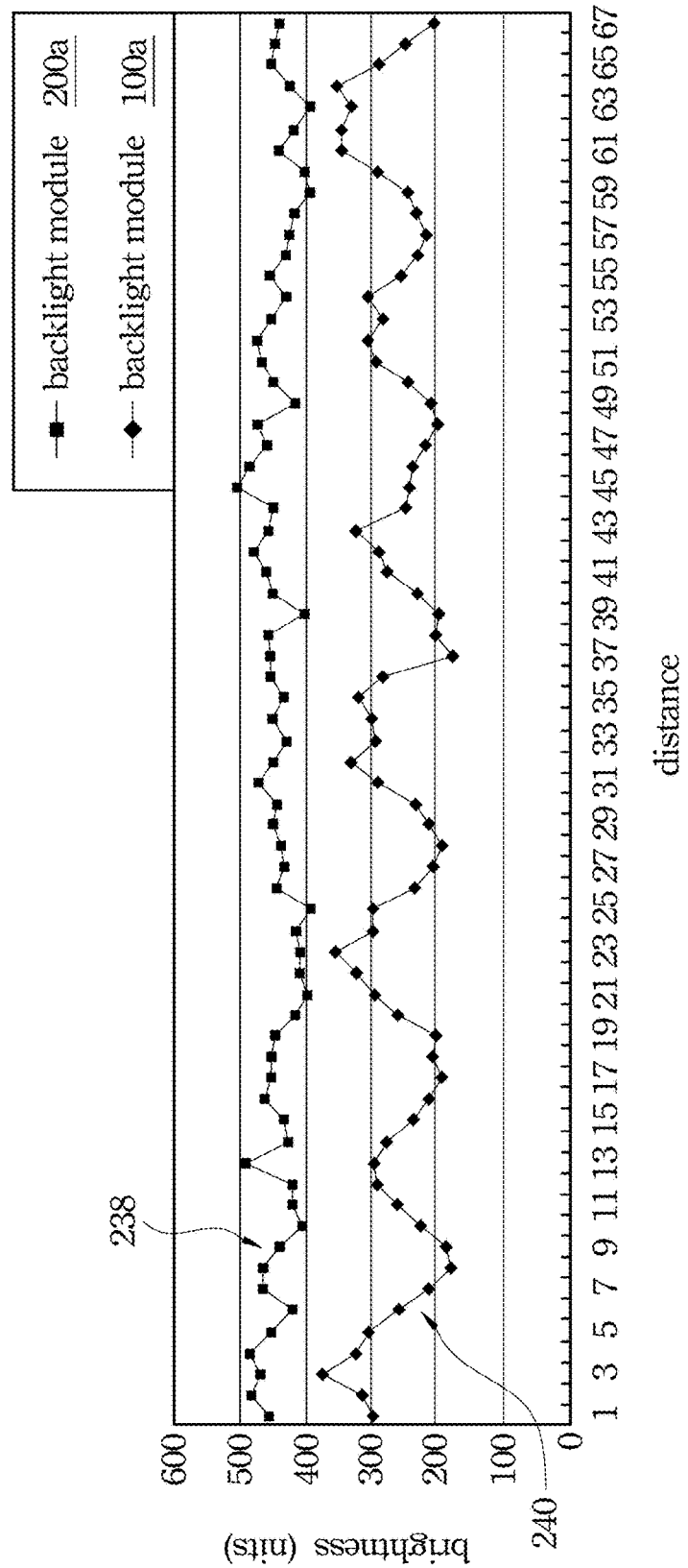
FIG. 8 is a diagram showing appearance brightness distribution curves on the incidence sides of the backlight modules shown in FIG. 7A and FIG. 7B.

Refer to FIG. 7A, FIG. 7B and FIG. 8. FIG. 7A, FIG. 7B and FIG. 8 are diagrams respectively showing appearance brightness distribution on a light incidence side of the backlight module shown in FIG. 3, appearance brightness distribution on a light incidence side of the backlight module shown in FIG. 6A, and appearance brightness distribution curves on the incidence sides of the backlight modules shown in FIG. 7A and FIG. 7B. According to FIG. 7A, it is known that the uneven brightness condition of the non-visible region 118 on the light incidence side of the conventional backlight module 100a is very serious, and the hot spots 116a are formed on the non-visible region 118. However, according to FIG. 7B, it is known that by arranging the stripe microstructures 204a parallel to the normal line of the light incidence surface 208 within the microstructure region 222 of the light-emitting surface 210 of the light guide plate 206a, the incident light of the non-visible region can be scattered, thereby can effectively blur the leakage light on the non-visible region. Accordingly, the brightness distribution of the microstructure region 222 of the backlight module 200a is obviously more uniform than that of the conventional backlight module 100a.

In addition, as shown in FIG. 8, according to the brightness distribution curves of the backlight modules 100a and 200a obtained along measure lines 236 in FIG. 7A and FIG. 7B, it is known that a brightness distribution curve 238 of the backlight module 200a is gentler, and the undulation of a brightness distribution curve 240 of the backlight module 100a is greater. It is also known that the brightness distribution of the microstructure region 222 of the backlight module 200a is more uniform than that of the conventional backlight module 100a.

Figure 9:
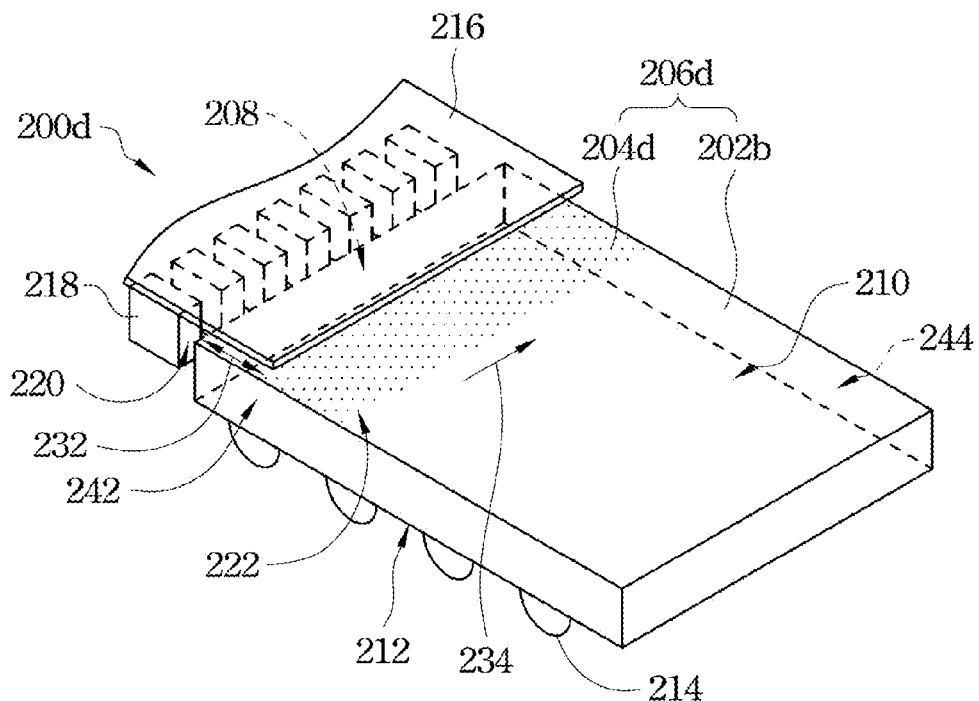
FIG. 9 illustrates a perspective view of a backlight module in accordance with further another embodiment of the present invention.

Refer to FIG. 9. FIG. 9 illustrates a perspective view of a backlight module in accordance with further another embodiment of the present invention. A structure of a backlight module 200d of the present embodiment is substantially the same as that of the backlight module 200 of the aforementioned embodiment, and differences between the two structures are that a main body 202b of a light guide plate 206d of the backlight module 200d includes a plurality of dot microstructures 204d rather than stripe microstructures 204; a microstructure region 222 of a light-emitting surface 210 of the main body 202b is separated from the light incidence surface 208 by a distance 232; and the backlight module 200d further includes a cover 216.

In the backlight module 200d, the main body 202b includes a first side surface 242 and a second side surface 244 opposite to each other. The first side surface 242, the light incidence surface 208 and the second side surface 244 are connected to three adjacent edges of the light-emitting surface 210 in sequence, i.e. the light incidence surface 208 is located between the first side surface 242 and the second side surface 244. In addition, the first side surface 242, the light incidence surface 208 and the second side surface 244 all are connected between the light-emitting surface 210 and the light reflective surface 212.

In the main body 202b, the microstructure region 222 extends from an edge of the light-emitting surface 210 connected with the first side surface 242 to another edge of the light-emitting surface 210 connected with the second side surface 244. In one exemplary example, a direction 234 of the microstructure region 222 extending on the light-emitting surface 210 from the first side surface 242 to the second side surface 244 may be perpendicular to the normal line of the light incidence surface 208. Furthermore, in one exemplary example, the distance 232 between the microstructure region 222 and the light incidence surface 208 may be greater than 0, and equal to or smaller than 20 mm, for example.

In the light guide plate 206d, the dot microstructures 204d are uniformly distributed in the whole microstructure region 222 of the light-emitting surface 210. In addition, the dot microstructures 204d may be dot diffusing structures with matted surfaces and not conoid surface structures. In some exemplary examples, the dot microstructures 204d may be sand blasting dot structures or laser dot structures formed by a sand blasting method or a laser method.

As shown in FIG. 9, the cover 216 may extend from the top of the light sources 218 to the top of the light-emitting surface 210 of the main body 202b of the light guide plate 206d, and may at least cover the light-emitting surface 220 of the light sources 218, the light incidence surface 208 of the main body 202b, and a portion of the light-emitting surface 210 near the light incidence surface 208. In one exemplary example, the cover 216 may cover a portion of the microstructure region 222. The cover 216 may have a reflection capability, and light emitted by the light sources 218 toward the cover 216 can be reflected to the light-emitting surface 210 of the main body 202b.

The emitting light of the point light sources, such as the light-emitting diodes, is highly directional and narrow, and by distributing the dot microstructures 204d in the whole microstructure region 222 of the light-emitting surface 210 of the main body 202b, the light reflected by the cover 216 toward the light-emitting surface 210 can be scattered. Therefore, a spray phenomenon caused by the point light sources with high directionality can be effectively blurred by the dot microstructures 204d. Accordingly, brightness on a light incidence side of the light guide plate 206d is uniformed to further uniform brightness of a light-emitting surface of the backlight module 200d.

Figure 10:
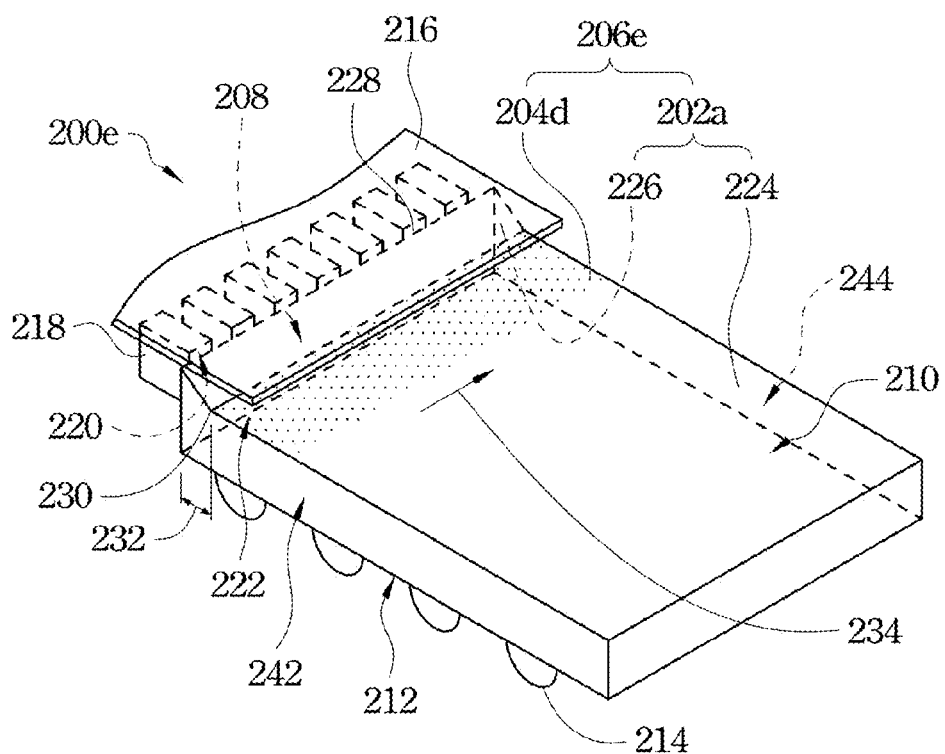
FIG. 10 illustrates a perspective view of a backlight module in accordance with still yet another embodiment of the present invention.

Refer to FIG. 10. FIG. 10 illustrates a perspective view of a backlight module in accordance with still yet another embodiment of the present invention. A structure of a backlight module 200e of the present embodiment is substantially the same as that of the backlight module 200d of the aforementioned embodiment, and a difference between the two structures is that a main body 202a of a light guide plate 206e of the backlight module 200e is not a flat plate with a uniform thickness.

In the backlight module 200e, the light guide plate 206e is similar to the light guide plate 206a shown in FIG. 6A, and includes a tapered portion 226 and a flat plate portion 224. The tapered portion 226 has a first end 228 and a second end 230 opposite to each other. The thickness of the tapered portion 226 is gradually decreased from the first end 228 to the second end 230, i.e. the first end 228 of the tapered portion 226 is thicker than the second end 230. In addition, the flat plate portion 224 extends from the second end 230 of the tapered portion 226 along the normal line of the light incidence surface 208. A thickness of the flat plate portion 224 is the same as that of the second end 230 of the tapered portion 226. In the present embodiment, the microstructure region 222 is located on the flat plate portion 224 and does not extend to the tapered portion 226.

Figure 11:
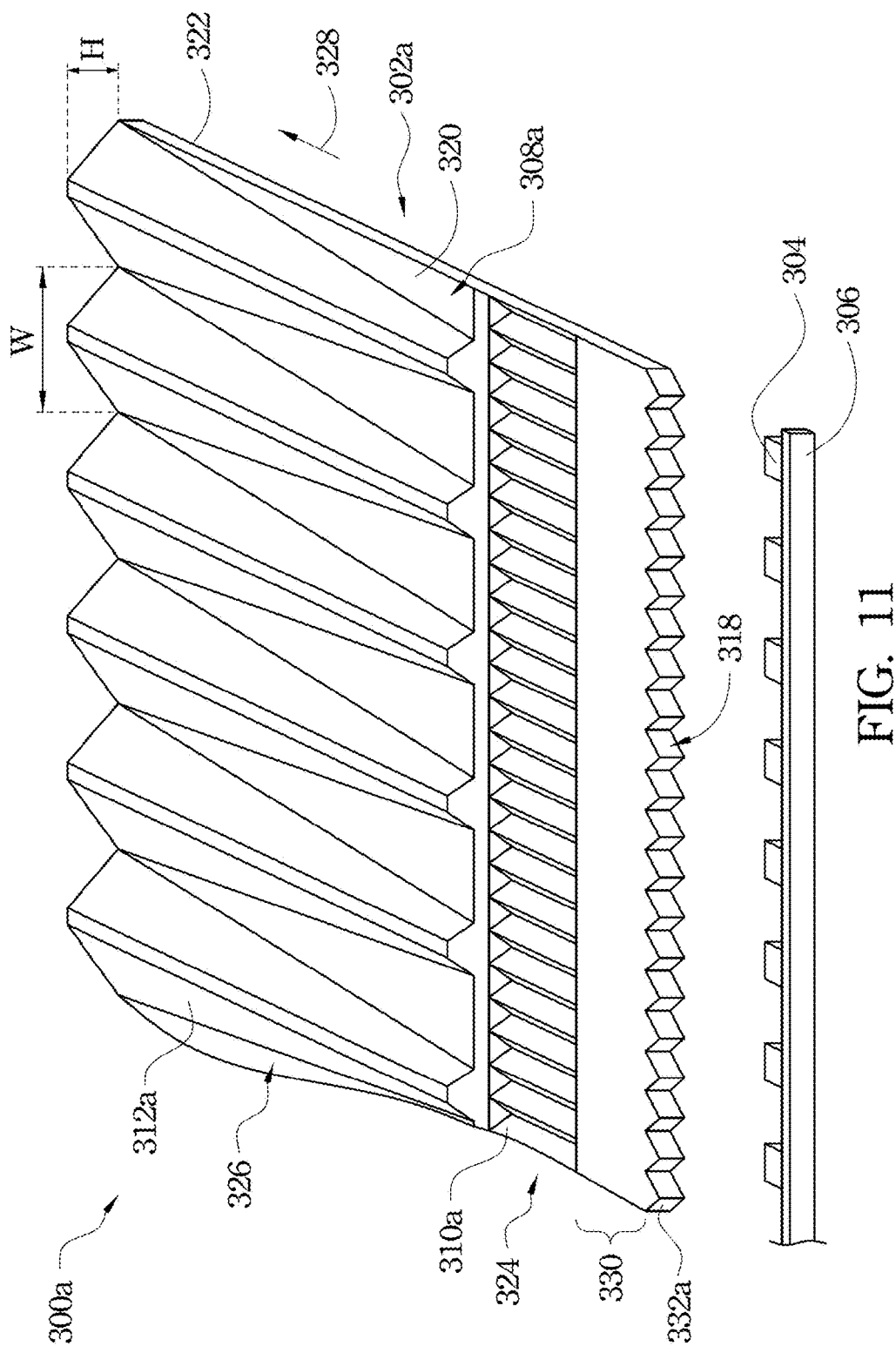
FIG. 11 illustrates a perspective view of a light source module in accordance with another embodiment of the present invention.

FIG. 11 illustrates a perspective view of a light source module in accordance with another embodiment of the present invention. As shown in FIG. 11, a light source module 300a mainly includes a light guide plate 302a and various light sources 304. The light guide plate 302a includes a main body 308a, various first stripe microstructures 310a and various second stripe microstructures 312a. The main body 308a may include a light incidence surface 318, a light-emitting surface 320 and a light reflective surface 322. In the main body 308a, the light-emitting surface 320 and the light reflective surface 322 are on two opposite sides of the main body 308a, and the light incidence surface 318 is connected between the light-emitting surface 320 and the light reflective surface 322. The light incidence surface 318 of the main body 308a may be a mirror surface or a surface having microstructures 332a as shown in FIG. 11. In addition, the light-emitting surface 320 of the main body 308a may include a first microstructure region 324 and a second microstructure region 326. The first microstructure region 324 and the second microstructure region 326 are arranged in sequence, in which the first microstructure region 324 is nearer the light incidence surface 318 than the second microstructure region 326.

Figure 11A:
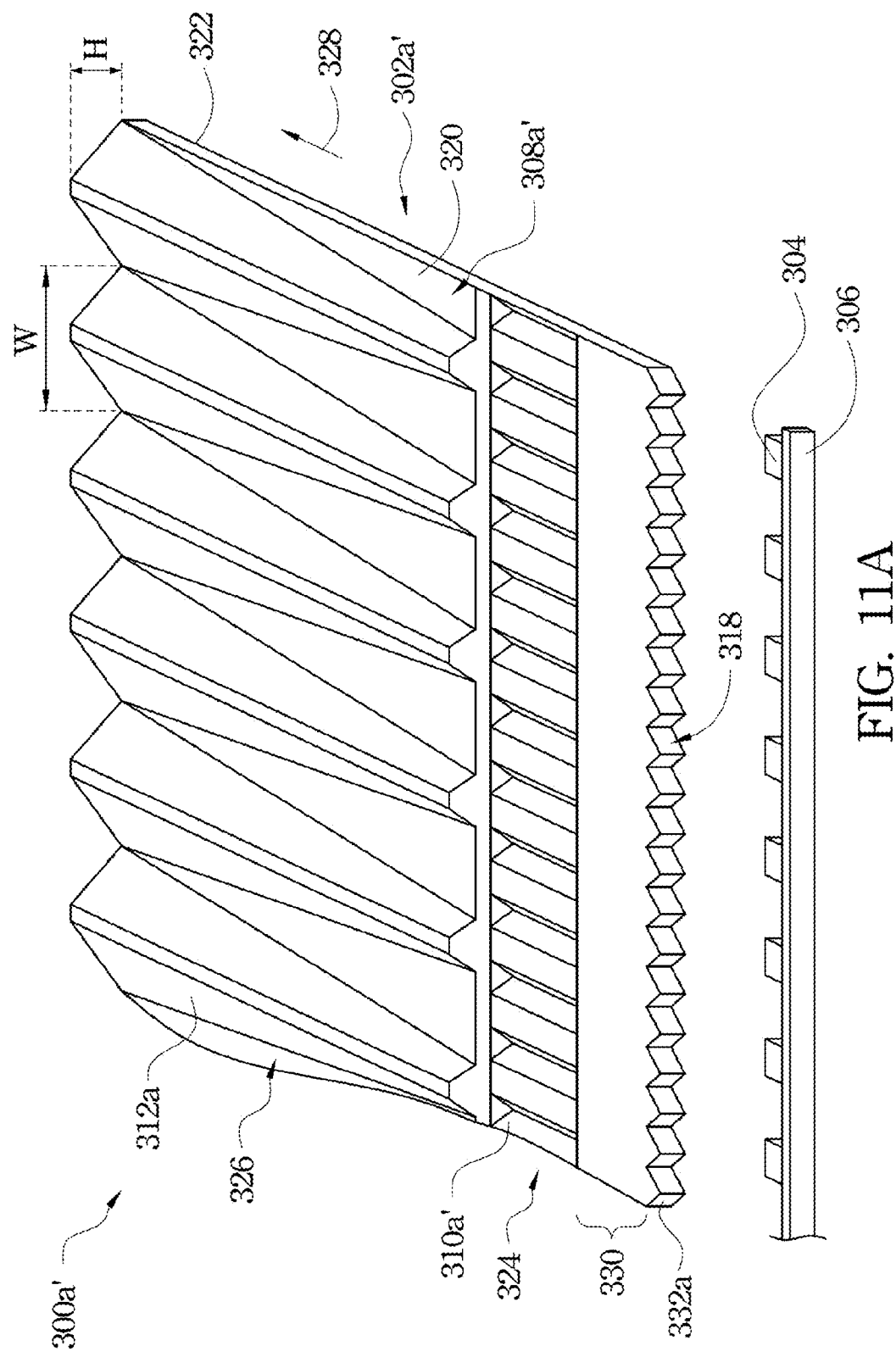
FIG. 11A illustrates a perspective view of a light source module in accordance with another embodiment of the present invention.

In the light guide plate 302a, the first stripe microstructures 310a are disposed in the first microstructure region 324 of the light-emitting surface 320. The first stripe microstructures 310a extends along a direction 328, which is from one side of the main body 308a near the light incidence surface 318 to the other side of the main body 308a away from the light incidence surface 318. In one exemplary example, an extending direction of each first stripe microstructures 310a is parallel to a normal line of the light incidence surface 318. In some examples, the first stripe microstructures 310a are continuously disposed, i.e. the first stripe microstructures 310a are closely adjacent to each other. In certain examples, as shown in FIG. 11A, in a main body 308a' of a light guide plate 302a' of a light source module 300a', various first stripe microstructures 310a' are discontinuously disposed, i.e. the first stripe microstructures 310a' are separated from each other.

Each of the first stripe microstructures 310a may be a convex portion or a concave portion. In exemplary examples, as shown in FIG. 11, each first stripe microstructure 310a is a concave portion. In some examples, each first stripe microstructure 310a is a V-cut structure or a R-cut structure, i.e. a cross-sectional profile of each first stripe microstructure 310a is in a V-shape, an inverted V-shape or an arc-shape.

With the arrangement of the first stripe microstructures 310a in the first microstructure region 324 of the light-emitting surface 320 of the light guide plate 302a, the leakage light on the non-visible region near the light incidence surface 318 is improved.

In the light guide plate 302a, the second stripe microstructures 312a are disposed in the second microstructure region 326 of the light-emitting surface 320. The second stripe microstructures 312a extends along the direction 328 similarly. In some examples, the second stripe microstructures 312a are continuously disposed, i.e. the second stripe microstructures 312a are closely adjacent to each other. In certain examples, the second stripe microstructures 312a are discontinuously disposed, i.e. the second stripe microstructures 312a are separated from each other such as second stripe microstructures 312b shown in FIG. 12. In some examples, every two adjacent second stripe microstructures 312a may have an equal or unequal distances, the arrangement density of the second stripe microstructures 312a can be changed by adjusting the distance between every two adjacent second stripe microstructures 312a, thereby increasing light-guiding function of the light guide plate 302a.

Each second stripe microstructure 312a may be a convex portion or a concave portion. In exemplary examples, as shown in FIG. 11, each second stripe microstructure 312a is a convex portion. In some examples, each second stripe microstructure 312a is in a V-shape, an inverted V-shape, an arc-shape or a trapezoid-shape. For example, as shown in FIG. 11, each second stripe microstructure 312a is in a trapezoid-shape.

Furthermore, a gradient of each second stripe microstructure 312a is gradually varied along the direction 328. As shown in FIG. 11, in the example of the second stripe microstructure 312a being a convex structure, the gradient of each second stripe microstructure 312a may be a height H or a width W. In certain examples, the gradient of each second stripe microstructure 312a may include both the height H and the width W. However, in the example of the second stripe microstructure being a concave structure, the gradient of each second stripe microstructure may be a depth or a width. In certain examples, the gradient of each second stripe microstructure may include both the depth and the width. In an exemplary example, as shown in FIG. 11, each second stripe microstructure 312a is a convex portion, the gradient of each second stripe microstructure 312a includes the height H and the width W, and the height H and the width W of each second stripe microstructure 312a becomes gradually greater from the light incidence surface 318 along the direction 328. In some examples, each second stripe microstructure 312a is a convex portion, the gradient of each second stripe microstructure 312a includes the height H, and the height H of each second stripe microstructure 312a becomes gradually greater from the light incidence surface 318 along the direction 328 while the width W of each second stripe microstructure 312a is constant. In certain examples, each second stripe microstructure 312a is a convex portion, the gradient of each second stripe microstructure 312a includes the width W, and the width W of each second stripe microstructure 312a becomes gradually greater from the light incidence surface 318 along the direction 328 while the height H of each second stripe microstructure 312a is constant.

Optical trends and degrees of light concentration of the light guide plate 302a can be changed by varying shapes, angles, heights, depths or arrangements of the second stripe microstructures 312a. Thus, with the arrangement of the second stripe microstructures 312a in the second microstructure region 326 of the light-emitting surface 320 of the light guide plate 302a, sparser portions of the second stripe microstructures 312a, which are nearer the first microstructure region 324, can solve the problem of the bright bands of the light guide plate 302a and improve the light-uniformity, and denser portions of the second stripe microstructures 312a, which are farther from the first microstructure region 324, can increase brightness of the light guide plate 302a.

Figure 11B:
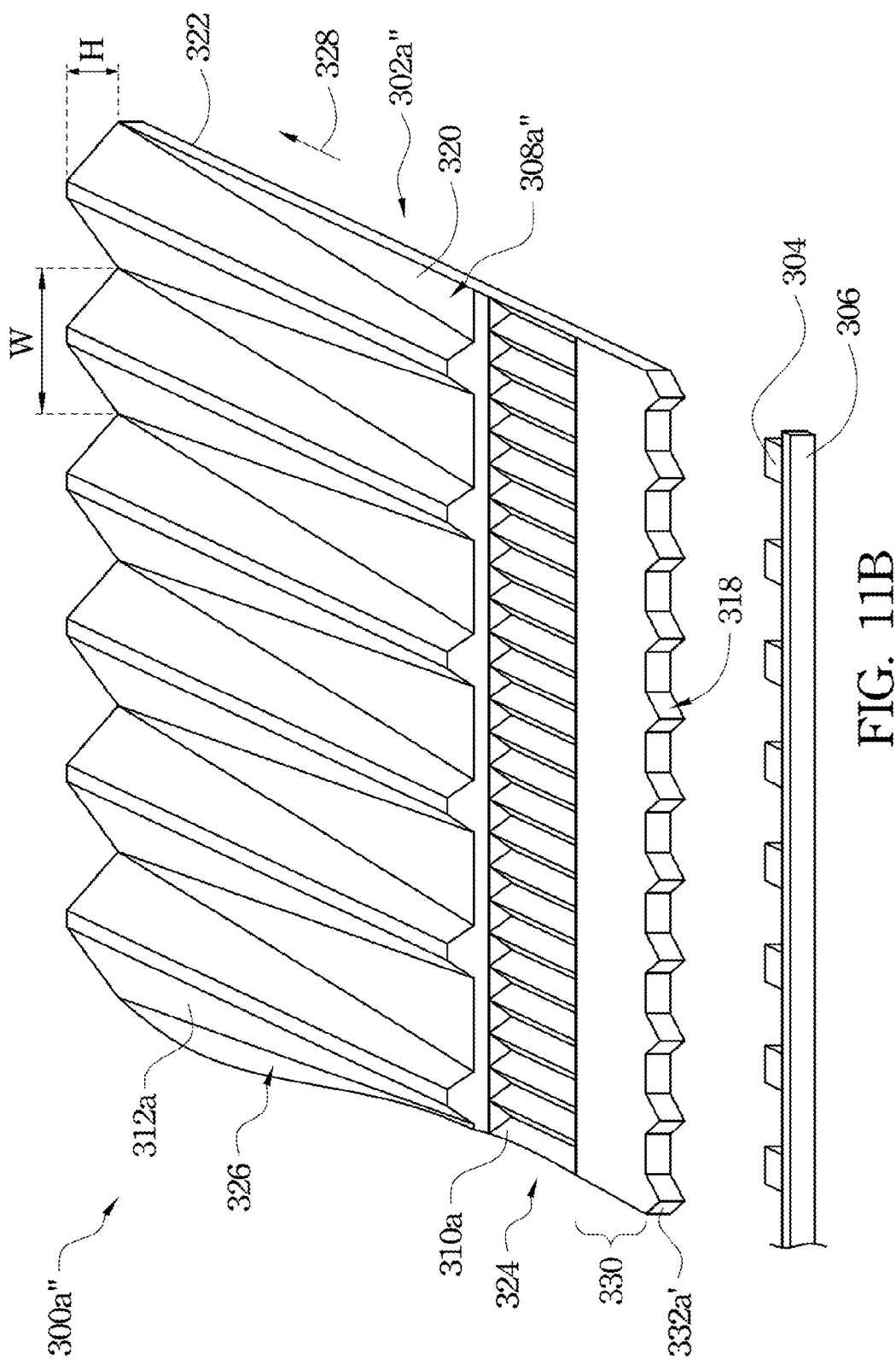
FIG. 11B illustrates a perspective view of a light source module in accordance with another embodiment of the present invention.

In some examples, the light guide plate 302a may further include various microstructures 332a, and the microstructures 332a are disposed on the light incidence surface 318. Each microstructure 332a may be a stripe structure, such as a V-cut structure or a R-cut structure, i.e. a cross-sectional profile of each microstructure 332a is in a V-shape, an inverted V-shape or an arc-shape. In certain examples, each microstructure 332a extends along a direction perpendicular to the normal line of the light incidence surface 318. In some examples, the microstructures 332a are continuously disposed, i.e. the microstructures 332a are closely adjacent to each other. In certain examples, as shown in FIG. 11B, in a main body 308a" of a light guide plate 302a" of a light source module 300a", various microstructures 332a' are discontinuously disposed, i.e. the microstructures 332a are separated from each other.

In some examples, the light-emitting surface 320 may further include a blank region 330 between the first microstructure region 324 and the microstructures 332a, i.e. the first stripe microstructures 310a do not extend from the light incidence surface 318. In certain examples, the first stripe microstructures 310a extend from the light incidence surface 318, and there is no blank region between the microstructures 332a and the first stripe microstructures 310a such as the stripe microstructures 204b which are extending from the light incidence surface 208 as shown in FIG. 6B.

Each of the microstructures 332a may be a convex portion or a concave portion. In exemplary examples, as shown in FIG. 11, each microstructure 332a is a convex portion. In some examples, each microstructure 332a is a V-cut structure or a R-cut structure, i.e. a cross-sectional profile of each microstructure 332a is in a V-shape, an inverted V-shape or an arc-shape.

With the arrangement of the microstructures 332a on the light incidence surface 318 of the light guide plate 302a, the incident light can be firstly scattered. Accordingly, the uniformity of the brightness distribution of the region near of the light incidence surface 318 is obviously improved, and hot spots can be eliminated. The blank region 330 between the first microstructure region 324 and the microstructures 332a can reflect internally the light transmitted in the light guide plate 302a by no cut or dot surface such as the blank region 330, thus the problem of the leakage light will be solved. Even few of light is not reflected in the light guide plate 302a to become leakage, with the arrangement of the first stripe microstructures 310a in the first microstructure region 324 of the light-emitting surface 320 of the light guide plate 302a, the leakage light on the non-visible region will be improved further.

The light sources 304 are disposed on a circuit board 306 and are electrically to the circuit board 306. The light sources 304 are disposed at a side of the light incidence surface 318, and adjacent to the light incidence surface 318, so that the light sources 304 can emit light toward the light incidence surface 318. In one exemplary example, the light sources 304 may be point light sources, such as light-emitting diodes.

Figure 12:
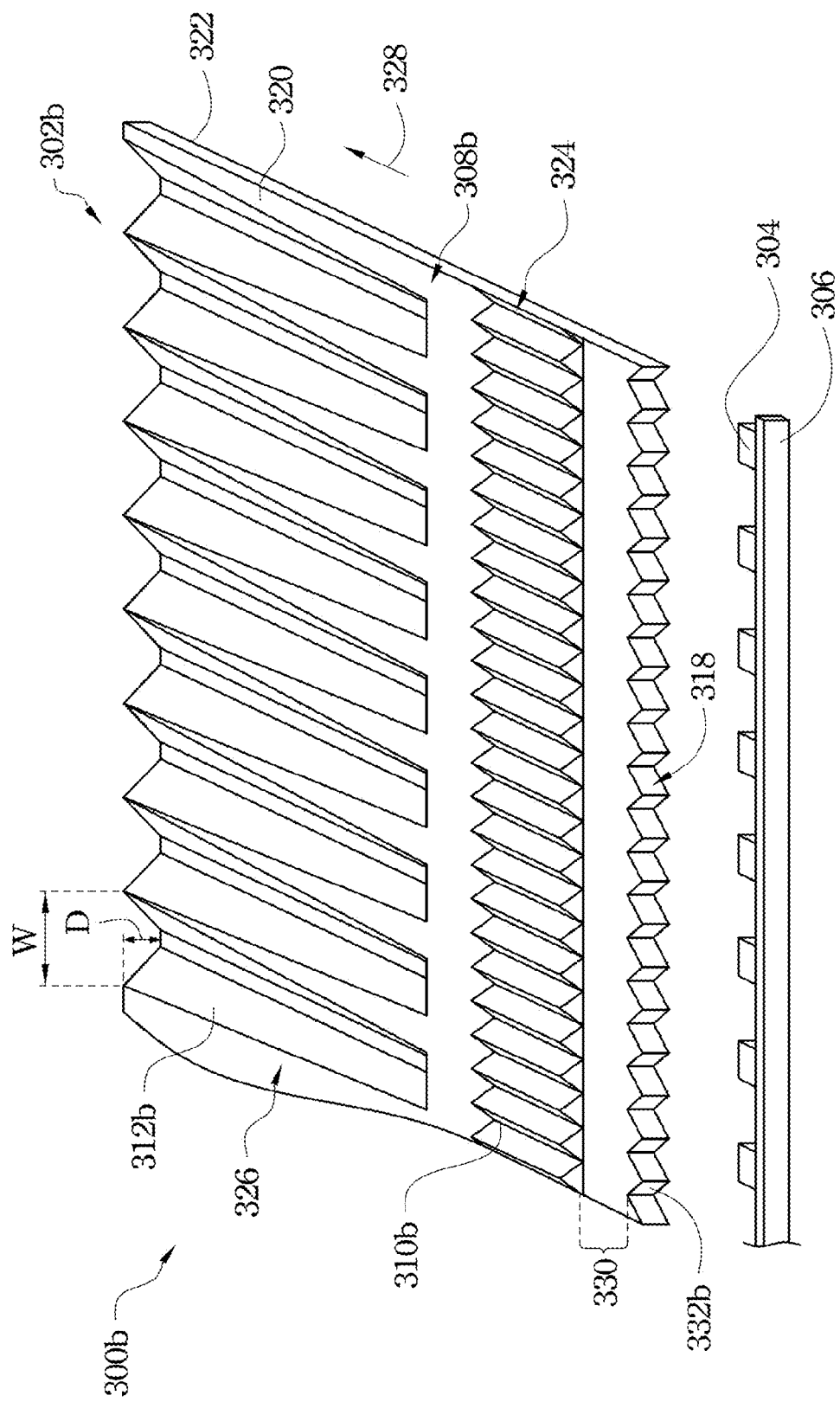
FIG. 12 illustrates a perspective view of a light source module in accordance with another embodiment of the present invention.

FIG. 12 illustrates a perspective view of a light source module in accordance with another embodiment of the present invention. As shown in FIG. 12, a structure of a light source module 300b of the present embodiment is substantially the same as that of the light source module 300a of the aforementioned embodiment, and differences between the two structures are that first stripe microstructures 310b of a main body 308b of a light guide plate 302b are convex portions, second stripe microstructures 312b of the main body 308b are concave portions, and microstructures 332b of the main body 308b are concave portions.

In the embodiment, each first stripe microstructure 310b is a V-cut structure, i.e. a cross-sectional profile of each first stripe microstructure 310b is in an inverted V-shape. Each microstructure 332b is a V-cut structure, i.e. a cross-sectional profile of each microstructure 332b is in a V-shape. In addition, each second stripe microstructure 312b is in a trapezoid-shape. A gradient of each second stripe microstructure 312b is gradually varied along the direction 328. As shown in FIG. 12, the gradient of each second stripe microstructure 312b may be a depth D or a width W. In certain examples, the gradient of each second stripe microstructure 312b may include both the depth D and the width W. In an exemplary example, as shown in FIG. 12, each second stripe microstructure 312b is a concave portion, the gradient of each second stripe microstructure 312b includes the depth D and the width W, and the depth D and the width W of each second stripe microstructure 312b becomes gradually greater from the light incidence surface 318 along the direction 328. In some examples, each second stripe microstructure 312b is a concave portion, the gradient of each second stripe microstructure 312b includes the depth D, and the depth D of each second stripe microstructure 312b becomes gradually greater from the light incidence surface 318 along the direction 328 while the width W of each second stripe microstructure 312b is constant. In certain examples, each second stripe microstructure 312b is a concave portion, the gradient of each second stripe microstructure 312b includes the width W, and the width W of each second stripe microstructure 312b becomes gradually greater from the light incidence surface 318 along the direction 328 while the depth D of each second stripe microstructure 312b is constant.

Figure 13:
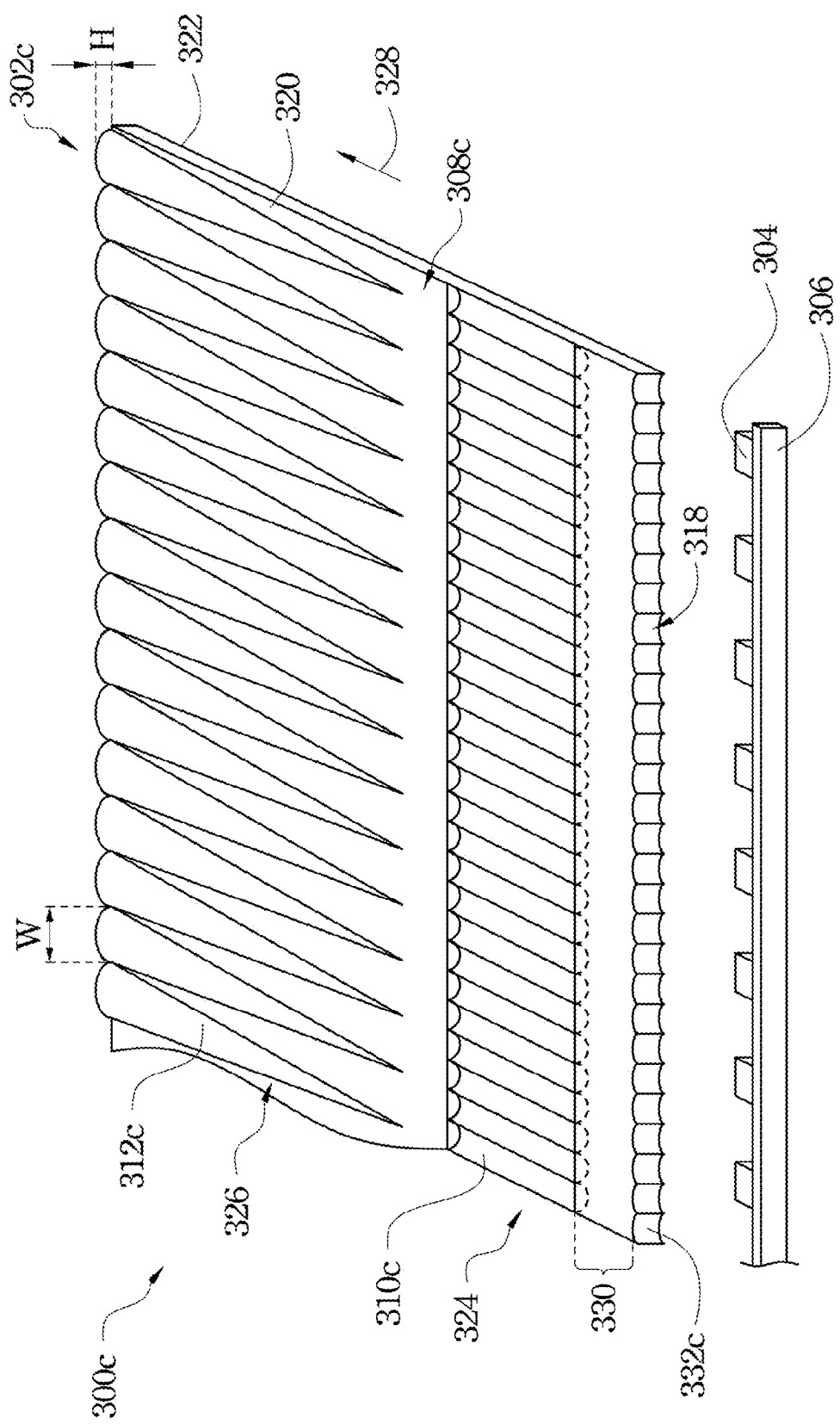
FIG. 13 illustrates a perspective view of a light source module in accordance with another embodiment of the present invention.

FIG. 13 illustrates a perspective view of a light source module in accordance with another embodiment of the present invention. As shown in FIG. 13, a structure of a light source module 300c of the present embodiment is substantially the same as that of the light source module 300a of the aforementioned embodiment, and differences between the two structures are that first stripe microstructures 310c of a main body 308c of a light guide plate 302c of the light source module 300c are in an arc-shape, second stripe microstructures 312c of the main body 308c are in an arc-shape, and microstructures 332c of the main body 308c are concave portions and in an arc-shape.

In the embodiment, each first stripe microstructure 310c is a R-cut structure, i.e. a cross-sectional profile of each first stripe microstructure 310c is in an arc-shape. Each microstructure 332c is a R-cut structure, i.e. a cross-sectional profile of each microstructure 332c is in an arc-shape. Furthermore, each second stripe microstructure 312c is in an arc-shape. A gradient of each second stripe microstructure 312c is gradually varied along the direction 328. As shown in FIG. 13, the gradient of each second stripe microstructure 312c may be a height H or a width W. In certain examples, the gradient of each second stripe microstructure 312c may include both the height H and the width W. In an exemplary example, referring to FIG. 13 again, each second stripe microstructure 312c is a convex portion, the gradient of each second stripe microstructure 312c includes the height H and the width W, and the height H and the width W of each second stripe microstructure 312c becomes gradually greater from the light incidence surface 318 along the direction 328.

Figure 14:
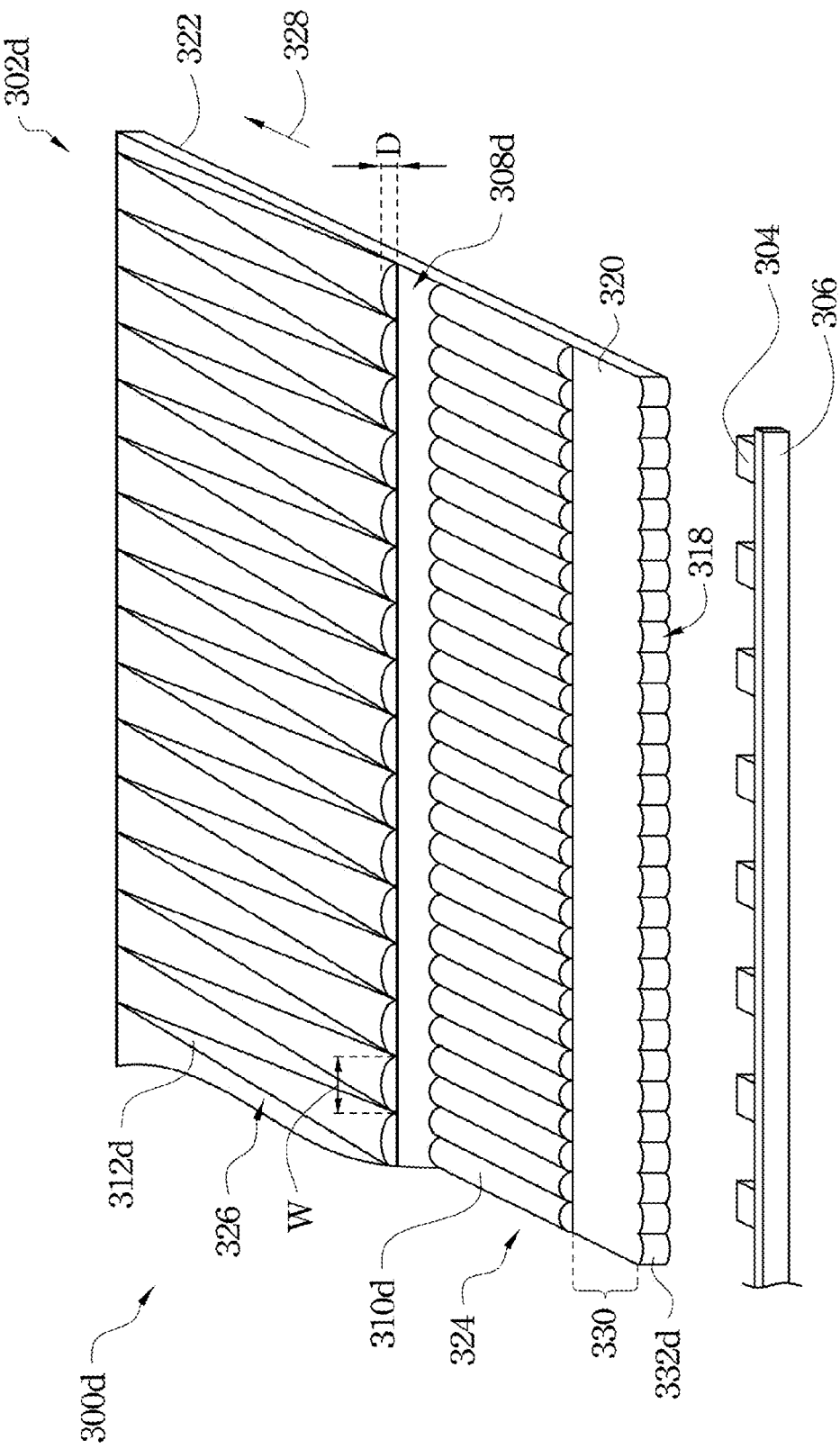
FIG. 14 illustrates a perspective view of a light source module in accordance with another embodiment of the present invention.

FIG. 14 illustrates a perspective view of a light source module in accordance with another embodiment of the present invention. As shown in FIG. 14, a structure of a light source module 300d of the present embodiment is substantially the same as that of the light source module 300c of the aforementioned embodiment, and differences between the two structures are that first stripe microstructures 310d of a main body 308d of a light guide plate 302d are convex portions, microstructures 332d of the main body 308d are convex portions, and a variation of a gradient of each second stripe microstructure 312d is different from that of the gradient of each second stripe microstructure 312c.

In the embodiment, as shown in FIG. 14, the gradient of each second stripe microstructure 312d may be a height H or a width W. In certain examples, the gradient of each second stripe microstructure 312d may include both the height H and the width W. In an exemplary example, referring to FIG. 14 again, each second stripe microstructure 312d is a convex portion, the gradient of each second stripe microstructure 312d includes the height H and the width W, and the height H and the width W of each second stripe microstructure 312d becomes gradually smaller from the light incidence surface 318 along the direction 328.

Figure 15:
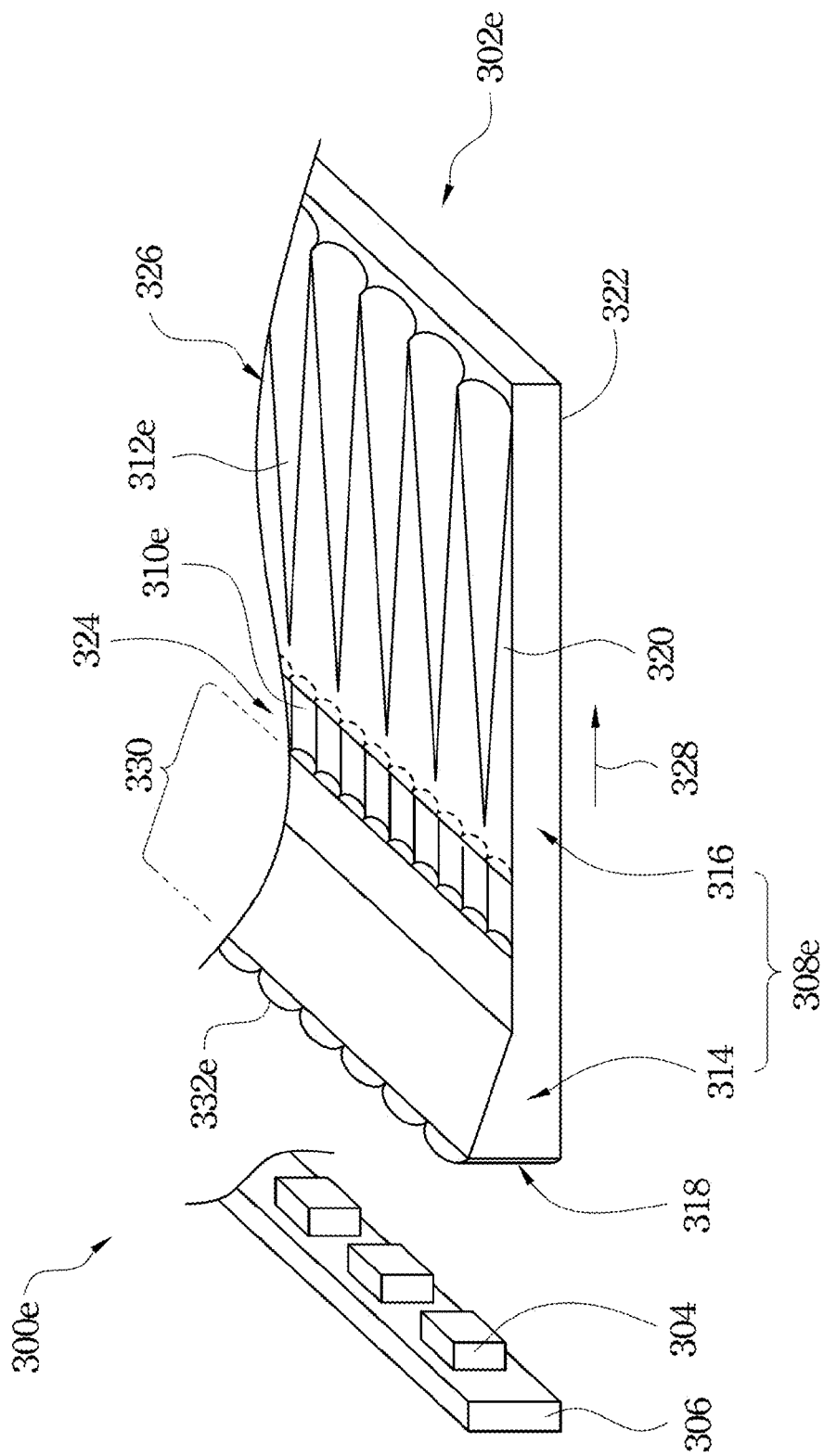
FIG. 15 illustrates a perspective view of a light source module in accordance with another embodiment of the present invention.

FIG. 15 illustrates a perspective view of a light source module in accordance with another embodiment of the present invention. As shown in FIG. 15, a structure of a light source module 300e of the present embodiment is substantially the same as that of the light source module 300c of the aforementioned embodiment, and differences between the two structures are that a main body 308e of a light guide plate 302e of the light source module 300e is similar to the main body 202a shown in FIG. 6A and includes a tapered portion 314 and a flat plate portion 316 directly connected to each other, second stripe microstructures 312e of the main body 308e are concave portions, and microstructures 332e of the main body 308e are convex portions.

In the embodiment, as shown in FIG. 15, the first stripe microstructures 310e are disposed on the flat plate portion 316. In some examples, a blank region 330 is located on the tapered portion 314 (such as the light guide plate 206c shown in FIG. 6C) or on both of the tapered portion 314 and the flat plate portion 316 as shown in FIG. 15. Each second stripe microstructure 312e is a R-cut structure, i.e. a cross-sectional profile of each first stripe microstructure 310e is in an arc-shape. Each microstructure 332e is a R-cut structure, i.e. a cross-sectional profile of each microstructure 332e is in an arc-shape.

According to the aforementioned embodiments of the present invention, advantages of the present invention are that a first microstructure region of a light-emitting surface of a light guide plate near a light incidence surface is set with various first stripe microstructures, which extend along a direction from one side of the main body near the light incidence surface to the other side of the main body away from the light incidence surface, so that the leakage light on the non-visible region near the light incidence surface is improved.

According to the aforementioned embodiments of the present invention, another advantage of the present invention is that a second microstructure region of the light-emitting surface of the light guide plate following the first microstructure region is set with various second stripe microstructures. Optical trends and degrees of light concentration of the light guide plate can be changed by varying shapes, angles, heights, depths or arrangements of second stripe microstructures according to the gradient of each of the second stripe microstructures, preferably, sparser portions of the second stripe microstructures, which are nearer the first microstructure region, can solve the problem of the bright bands of the light guide plate and improve the light-uniformity, and denser portions of the second stripe microstructures, which are farther from the first microstructure region, can increase brightness of the light guide plate.

According to the aforementioned embodiments of the present invention, still another advantage of the present invention is that a light incidence surface is set with microstructures, so that the uniformity of the brightness distribution of the region near of the light incidence surface is obviously improved, and hot spots can be eliminated.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A light guide plate, comprising:
   a main body, comprising:
      a light incidence surface;
      a first optic surface; and
      a second optic surface opposite to the first optic surface, wherein the first optic surface and the second optic surface are respectively connected to the light incidence surface; and
   a plurality of stripe microstructures disposed on at least one of the first optic surface and the second optic surface, wherein each of the stripe microstructures extends along a direction from one side of the main body near the light incidence surface to the other side of the main body away from the light incidence surface, wherein each of the stripe microstructures is inclined from one end near the light incidence surface to the other end away from the light incidence surface relative to the optic surface where the stripe microstructures are disposed;
   wherein the first optic surface or the second optic surface comprises a first microstructure region and a second microstructure region arranged in sequence, and the first microstructure region is nearer the light incidence surface than the second microstructure region; and
   wherein the stripe microstructures are disposed in the second microstructure region.

2. The light guide plate according to claim 1, wherein each of the stripe microstructures is a convex portion or a concave portion.

3. The light guide plate according to claim 2, wherein when each of the stripe microstructures is the convex portion, a height of each of the stripe microstructures becomes gradually greater or smaller from the end of each of the stripe microstructures near the light incidence surface to the other end of each of the stripe microstructures away from the light incidence surface, so that each of the stripe microstructures can be inclined from the end near the light incidence surface to the other end away from the light incidence surface relative to the optic surface where the stripe microstructures are disposed.

4. The light guide plate according to claim 2, wherein when each of the stripe microstructures is the concave portion, a depth of each of the stripe microstructures becomes gradually greater or smaller from the end of each of the stripe microstructures near the light incidence surface to the other end of each of the stripe microstructures away from the light incidence surface, so that each of the stripe microstructures can be inclined from the end near the light incidence surface to the other end away from the light incidence surface relative to the optic surface where the stripe microstructures are disposed.

5. The light guide plate according to claim 1, wherein a width of each of the stripe microstructures becomes gradually greater or smaller from the end of each of the stripe microstructures near the light incidence surface to the other end of each of the stripe microstructures away from the light incidence surface.

6. The light guide plate according to claim 1, wherein distances between any two adjacent stripe microstructures along an extending direction of the light incidence surface are the same.

7. The light guide plate according to claim 1, wherein the stripe microstructures are arranged in a plurality of microstructure regions, and a plural of non-microstructure regions are located between any two adjacent microstructure regions.

8. The light guide plate according to claim 7, wherein a width of each of the non-microstructure regions becomes gradually greater or smaller from one side of each of the non-microstructure regions near the light incidence surface to the other side of each of the non-microstructure regions away from the light incidence surface.

9. The light guide plate according to claim 7, wherein a thickness of a portion of the light guide plate which has the non-microstructure regions disposed thereon is constant from the side of the main body near the light incidence surface to the other side of the main body away from the light incidence surface.

10. The light guide plate according to claim 7, wherein an area ratio of one of the microstructure region to its adjacent non-microstructure region is gradually varied along the direction where the stripe microstructures being extending along.

11. The light guide plate according to claim 1, wherein the first optic surface or the second optic surface further comprises a blank region between the first microstructure region and the light incidence surface.

12. The light guide plate according to claim 1, wherein the main body comprises:
    a tapered portion having a first end and a second end opposite to each other, wherein a thickness of the first end is larger than a thickness of the second end; and
    a flat plate portion extending from the second end along the direction, wherein a thickness of the flat plate portion is equal to the thickness of the second end.

13. The light guide plate according to claim 12, wherein the first microstructure region is disposed on the flat plate portion.

14. The light guide plate according to claim 13, wherein the first optic surface or the second optic surface further comprises a blank region between the first microstructure region and the microstructures, and the blank region is located on the tapered portion or on both of the tapered portion and the flat plate portion.

15. The light guide plate according to claim 1, further comprising a plurality of microstructures disposed on the light incidence surface.

16. A backlight module, comprising:
    a light guide plate as claimed in claim 1; and
    a light source, wherein light generated from the light source can enter the light guide plate from the light incidence surface.

17. The backlight module according to claim 16, wherein the light source is disposed along an axis, and the stripe microstructures are arranged along a direction which is vertical to the axis.

18. A light source module, comprising:
    a light guide plate as claimed in claim 1; and
    a plurality of light sources disposed adjacent to the light incidence surface of the light guide plate;
    wherein each of the stripe microstructures is a convex portion, and a height and a width of each of the stripe microstructures become gradually greater from the light incidence surface along the direction.

19. A light source module, comprising:
    a light guide plate as claimed in claim 1; and
    a plurality of light sources adjacent to the light incidence surface of the light guide plate;
    wherein each of the stripe microstructures is a convex portion, and a height and a width of each of the stripe microstructures become gradually smaller from the light incidence surface along the direction.

20. A light source module, comprising:
a light guide plate comprising:
- a main body, comprising:
  - a light incidence surface;
  - a first optic surface; and
  - a second optic surface opposite to the first optic surface, wherein the first optic surface and the second optic surface are respectively connected to the light incidence surface; and
- a plurality of stripe microstructures disposed on at least one of the first optic surface and the second optic surface, wherein each of the stripe microstructures extends along a direction from one side of the main body near the light incidence surface to the other side of the main body away from the light incidence surface, wherein each of the stripe microstructures is inclined from one end near the light incidence surface to the other end away from the light incidence surface relative to the optic surface where the stripe microstructures are disposed; and a plurality of light sources disposed adjacent to the light incidence surface of the light guide plate;
wherein each of the stripe microstructures is a concave portion, and a depth and a width of each of the stripe microstructures become gradually greater from the light incidence surface along the direction.

21. A light source module, comprising:
a light guide plate comprising:
- a main body, comprising:
  - a light incidence surface;
  - a first optic surface; and
  - a second optic surface opposite to the first optic surface, wherein the first optic surface and the second optic surface are respectively connected to the light incidence surface; and
- a plurality of stripe microstructures disposed on at least one of the first optic surface and the second optic surface, wherein each of the stripe microstructures extends along a direction from one side of the main body near the light incidence surface to the other side of the main body away from the light incidence surface, wherein each of the stripe microstructures is inclined from one end near the light incidence surface to the other end away from the light incidence surface relative to the optic surface where the stripe microstructures are disposed; and a plurality of light sources disposed adjacent to the light incidence surface of the light guide plate;
wherein each of the stripe microstructures is a concave portion, and a depth and a width of each of the stripe microstructures become gradually smaller from the light incidence surface along the direction.

* * * * *